(12) United States Patent
Bahk

(10) Patent No.: US 11,678,046 B2
(45) Date of Patent: Jun. 13, 2023

(54) METHOD FOR PHOTOGRAPHING DYNAMIC PICTURE AND VIDEO

(71) Applicant: BK LTD., Gumi-si (KR)

(72) Inventor: Jae Hyun Bahk, Gumi-si (KR)

(73) Assignee: BK LTD., Gumi-si (KR)

( * ) Notice: Subject to any disclaimer, the term of this patent is extended or adjusted under 35 U.S.C. 154(b) by 0 days.

(21) Appl. No.: 17/573,211

(22) Filed: Jan. 11, 2022

(65) Prior Publication Data
US 2022/0224826 A1    Jul. 14, 2022

(30) Foreign Application Priority Data
Jan. 13, 2021    (KR) .................. 10-2021-0004561

(51) Int. Cl.
| H04N 23/62 | (2023.01) |
| H04N 5/76 | (2006.01) |
| H04N 23/58 | (2023.01) |
| H04N 23/69 | (2023.01) |
| H04N 23/667 | (2023.01) |
| H04N 23/68 | (2023.01) |
| H04N 23/698 | (2023.01) |
| H04N 5/77 | (2006.01) |
| H04N 23/55 | (2023.01) |
| H04N 23/695 | (2023.01) |

(52) U.S. Cl.
CPC ............... *H04N 23/62* (2023.01); *H04N 5/76* (2013.01); *H04N 23/58* (2023.01); *H04N 23/69* (2023.01); *H04N 23/695* (2023.01)

(58) Field of Classification Search
None
See application file for complete search history.

(56) References Cited

U.S. PATENT DOCUMENTS

| 2007/0081082 | A1* | 4/2007 | Watanabe | H04N 5/32 348/222.1 |
| 2011/0279691 | A1* | 11/2011 | Ishii | H04N 1/215 348/207.99 |
| 2016/0234444 | A1* | 8/2016 | Hosono | H04N 5/2351 |
| 2017/0374288 | A1* | 12/2017 | Kino | H04N 5/2351 |
| 2018/0086130 | A1* | 3/2018 | Hashimoto | B42D 9/06 |
| 2018/0262686 | A1* | 9/2018 | Haneda | H04N 5/23216 |
| 2019/0089893 | A1* | 3/2019 | Tokairin | H04N 1/0035 |
| 2019/0124255 | A1* | 4/2019 | Ueguri | H04N 5/232122 |
| 2021/0392265 | A1* | 12/2021 | Kim | H04N 5/232933 |

FOREIGN PATENT DOCUMENTS

| KR | 10-0799213 B1 | 1/2008 |
| KR | 10-2009-0020291 A | 2/2009 |

* cited by examiner

*Primary Examiner* — Hung Q Dang
(74) *Attorney, Agent, or Firm* — NKL Law; Jae Youn Kim

(57) ABSTRACT

Discloses is a method for photographing a dynamic picture and a dynamic video, the method including: (a) selecting a photographing target; (b) setting a total photographing time and a camera action operation time; (c) selecting at least one camera action operation; and (d) photographing a dynamic movement by applying the camera action operation for the set time. Accordingly, various dynamic movements are photographed by selecting the photographing target, setting a time during which a camera action is operated in the total photographing time, and selecting the camera action for the set time.

13 Claims, 28 Drawing Sheets

Camera action picture settings (multiple selections are possible)

- ● Horizontal left
- ○ Horizontal right
- ○ Vertical upward
- ○ ertical downward
- ○ Big vibration
- ○ Small vibration
- ○ Horizontal vibration
- ○ Vertical vibration
- ○ Zigzag

- ○ Clockwise rotation
- ○ Counterclockwise rotation
- ○ Zoom-in
- ○ Zoom-out
- ○ User-specified movement

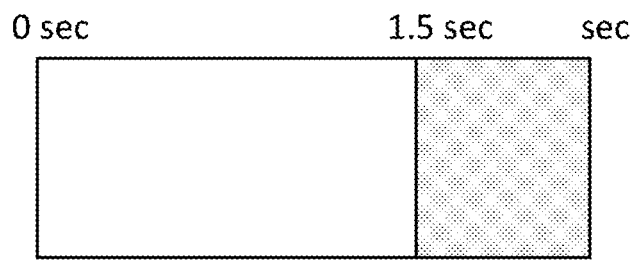

Total photographing time of 2 seconds, Camera action ratio of 25%

FIG. 20A

FIG. 20B

FIG. 20C

Camera action picture settings (multiple selections are possible)

- ○ Horizontal left
- ○ Horizontal right
- ● Vertical upward
- ○ Vertical downward
- ○ Big vibration
- ○ Small vibration
- ○ Horizontal vibration
- ○ Vertical vibration
- ○ Zigzag
- ○ Clockwise rotation
- ○ Counterclockwise rotation
- ○ Zoom-in
- ○ Zoom-out
- ○ User-specified movement

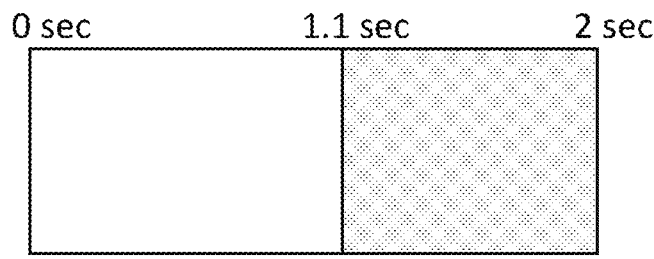

Total photographing time of 2 seconds, Camera action ratio of 45%

FIG. 21A

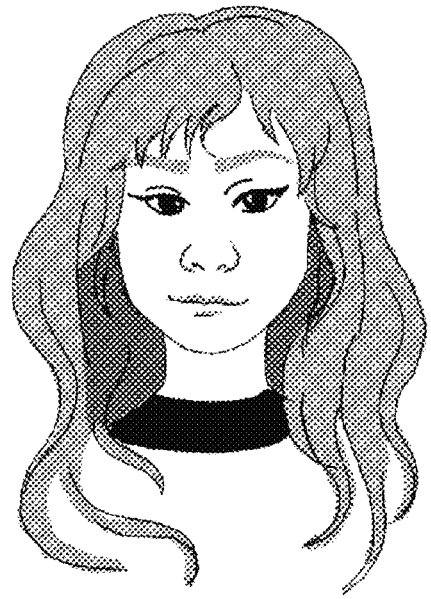

FIG. 21B

FIG. 21C

Camera action picture settings (multiple selections are possible)

- ○ Horizontal left
- ○ Horizontal right
- ○ Vertical upward
- ○ Vertical downward
- ○ Big vibration
- ○ Small vibration
- ○ Horizontal vibration
- ○ Vertical vibration
- ○ Zigzag
- ● Clockwise rotation
- ○ Counterclockwise rotation
- ○ Zoom-in
- ○ Zoom-out
- ○ User-specified movement

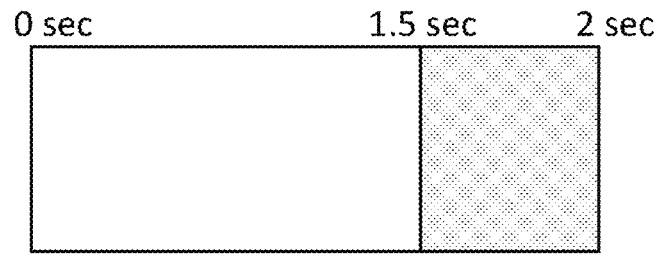

Total photographing time of 2 seconds, Camera action ratio of 25%

FIG. 22A

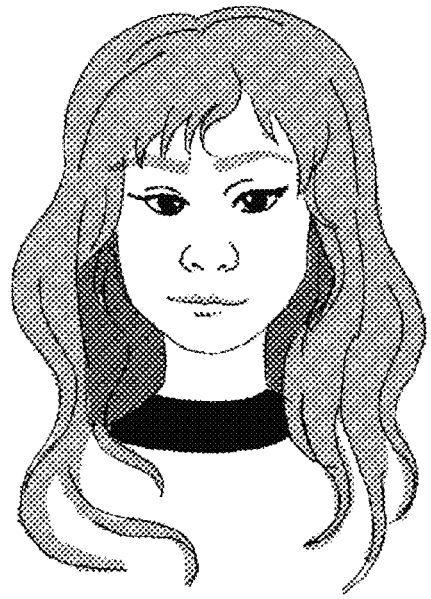

FIG. 22B

FIG. 22C

Camera action picture settings (multiple selections are possible)
- ○ Horizontal left
- ○ Horizontal right
- ○ Vertical upward
- ○ Vertical downward
- ○ Big vibration
- ○ Small vibration
- ● Horizontal vibration
- ● Vertical vibration
- ○ Zigzag
- ○ Clockwise rotation
- ○ Counterclockwise rotation
- ○ Zoom-in
- ○ Zoom-out
- ○ User-specified movement

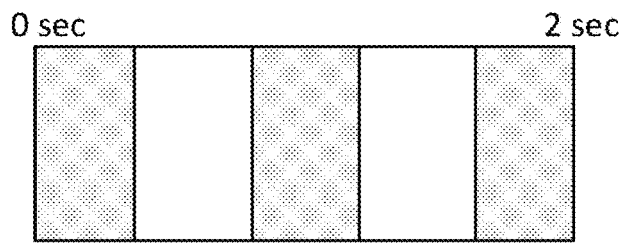

Total photographing time of 2 seconds, Camera action ratio of 20% for 3 times, which applies a total effect of 60%

FIG. 23A

 

FIG. 23B       FIG. 23C

Camera action picture settings (multiple selections are possible)

- ● Horizontal left
- ○ Horizontal right
- ○ Vertical upward
- ○ Vertical downward
- ● Big vibration
- ○ Small vibration
- ○ Horizontal vibration
- ○ Vertical vibration
- ○ Zigzag
- ○ Clockwise rotation
- ○ Counterclockwise rotation
- ○ Zoom-in
- ○ Zoom-out
- ○ User-specified movement

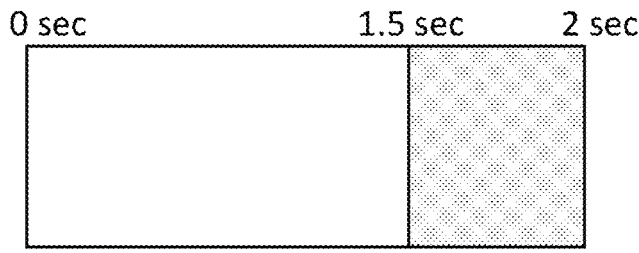

Total photographing time of 2 seconds, Camera action ratio of 25%

FIG. 24A

FIG. 24B

FIG. 24C

METHOD FOR PHOTOGRAPHING DYNAMIC PICTURE AND VIDEO

BACKGROUND OF THE INVENTION

1. Field of the Invention

The present invention relates to an apparatus and a method for photographing a picture and a video, and more particularly, to an apparatus and s method for photographing a dynamic picture and a dynamic video, such as a panning shot, a zoom-in shot, a rotation shot, and a vibration shot, by using various actions of a digital camera in a location and a time period specified by a user in a total photographing time of the camera.

2. Description of the Related Art

Recently, as mobile camera technology develops, many mobile users may perform various photographing operations as in a high-end single-lens reflex (SLR)/digital single-lens reflex (DSLR) camera by using a camera of a mobile device instead of an existing high-end SLR/DSLR camera. However, there are still many differences between the camera of the mobile device and a picture camera of experts.

In other words, when a mobile camera photographs a picture once, the photographing may be performed for a preset time at a fixed viewpoint in a fixed composition.

Meanwhile, the picture camera of the experts such as a high-end DSLR camera may implement various dynamic picture techniques.

For example, FIG. 1 is a view showing an example of a camera to which a gimbal is installed, FIG. 2 is a view showing an example of a gimbal-integrated camera, and FIG. 3 is a view for describing a panorama photographing technique.

Conventionally, a dynamic picture has been photographed by using a camera to which a gimbal is installed as shown in FIG. 1, or using a gimbal-integrated camera as shown in FIG. 2.

Alternatively, as shown in FIG. 3, a dynamic picture has been photographed by using a panorama technique of divisionally photographing several pictures at mutually different photographing points and synthesizing the photographed pictures into one picture.

Meanwhile, FIG. 4 is a view showing an example of a dynamic video photographing technique according to the related art.

Conventionally, as shown in FIG. 4, a dynamic video has been photographed by photographing a first viewpoint for 3 seconds, moving to a second viewpoint to photograph the second viewpoint for 5 seconds, and moving to a third viewpoint to photograph the third viewpoint for 10 seconds.

However, a technique for photographing a dynamic picture and a dynamic video described above is a function implemented in a camera for a photographic expert, so that the technique has not been implemented in the mobile camera.

For example, when a panning shot is photographed by using the high-end DSLR camera, a user has to set a photographing time and an exposure by using the camera, start photographing, and perform the photographing while moving in the same direction as a movement of a photographing target.

As described above, the skill and experience of the user is very important in a panning shot technique, so that there have been limitations for users of the mobile camera to photograph good pictures.

Therefore, there is a demand for developing a technology capable of photographing a dynamic picture and a dynamic video by easily applying various dynamic picture techniques such as synthesizing several static and dynamic pictures into one picture when a user performs photographing by using various camera actions within a specific time period in a total photographing time.

SUMMARY OF THE INVENTION

To solve the problems as described above, an object of the present invention is to provide a method for photographing a dynamic picture and a dynamic video, capable of photographing various dynamic movements by selecting a photographing target, setting a time during which a camera action is operated in a total photographing time, and selecting the camera action for the set time.

Another object of the present invention is to provide a method for photographing a dynamic picture and a dynamic video, capable of photographing a static picture and a dynamic picture to which various dynamic picture techniques are applied as one picture.

To achieve the objects described above, according to the present invention, there is provided a method for photographing a dynamic picture and a dynamic video, the method including: (a) selecting a photographing target; (b) setting a total photographing time and a camera action operation time; (c) selecting at least one camera action operation; and (d) photographing a dynamic movement by applying the camera action operation for the set time.

As described above, according to the method for photographing the dynamic picture and the dynamic video of the present invention, various dynamic movements can be photographed by selecting the photographing target, setting the time during which the camera action is operated in the total photographing time, and selecting the camera action for the set time.

In addition, according to the present invention, a static picture and a dynamic picture to which various dynamic picture techniques are applied can be photographed as one picture.

Accordingly, according to the present invention, a general user without professional knowledge about picture photographing can easily and conveniently photograph the dynamic picture to which various dynamic picture techniques are applied by using a mobile camera or the like.

In addition, according to the present invention, the user can easily photograph a special effect video for screen switching in the middle of photographing a general video by setting a camera action operation and a time, and photographing a video for the set time when photographing the video.

BRIEF DESCRIPTION OF THE DRAWINGS

FIGS. 20A-C to 24A-C are views illustrating a camera action operation setting screen, a photographing target, and a photographed dynamic picture.

DETAILED DESCRIPTION OF THE INVENTION

Hereinafter, a method for photographing a dynamic picture and a dynamic video according to an exemplary embodiment of the present invention will be described in detail with reference to the accompanying drawings.

First, the method for photographing the dynamic picture according to the exemplary embodiment of the present invention will be described in detail with reference to FIG. 5.

Figure 1:
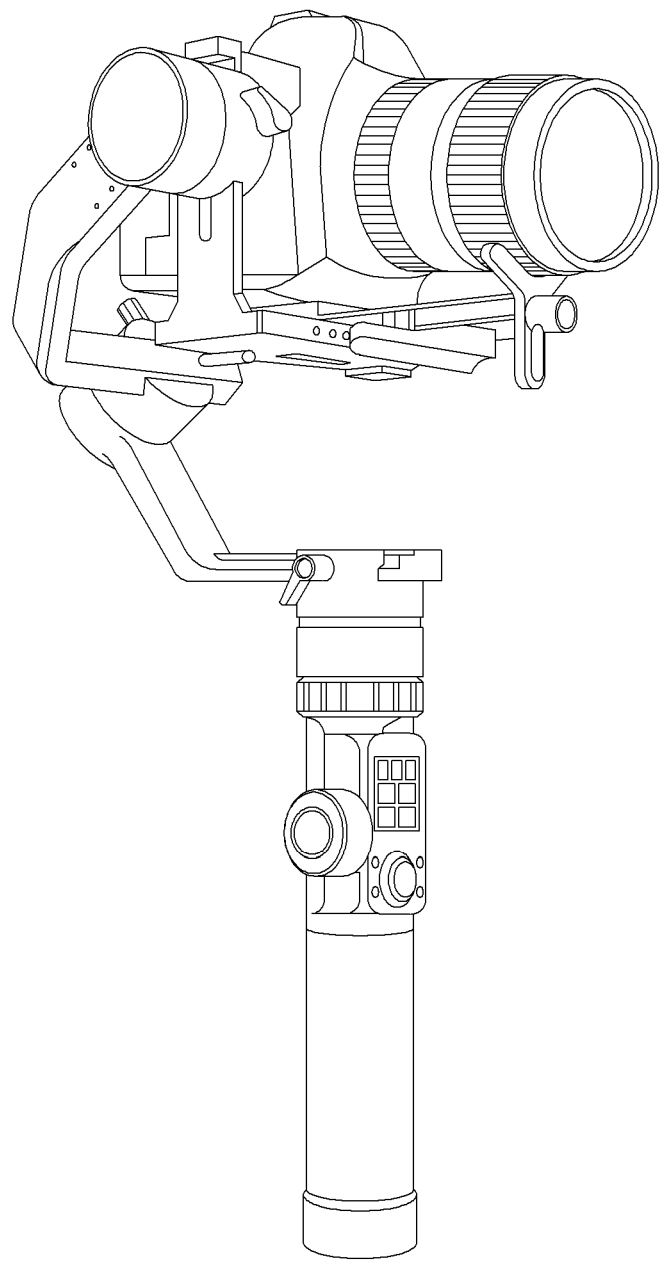
FIG. 1 is a view showing an example of a camera to which a gimbal is installed.
Figure 2:
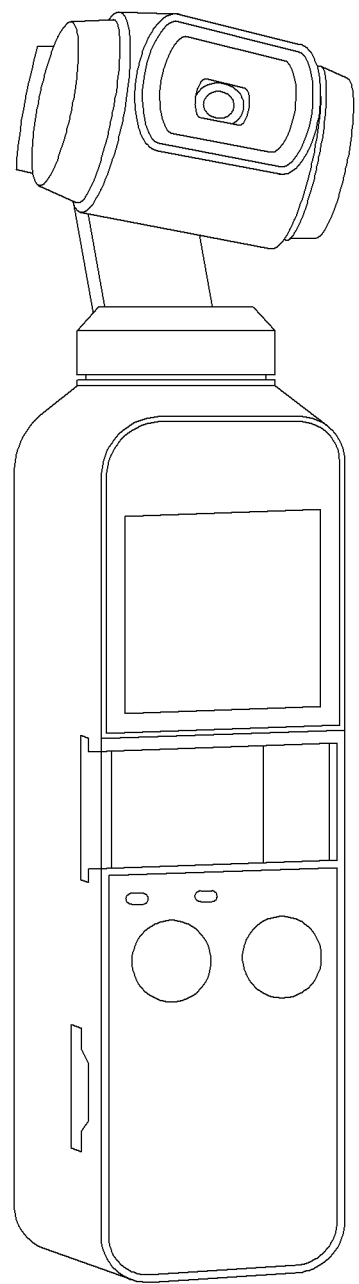
FIG. 2 is a view showing an example of a gimbal-integrated camera.
Figure 3:
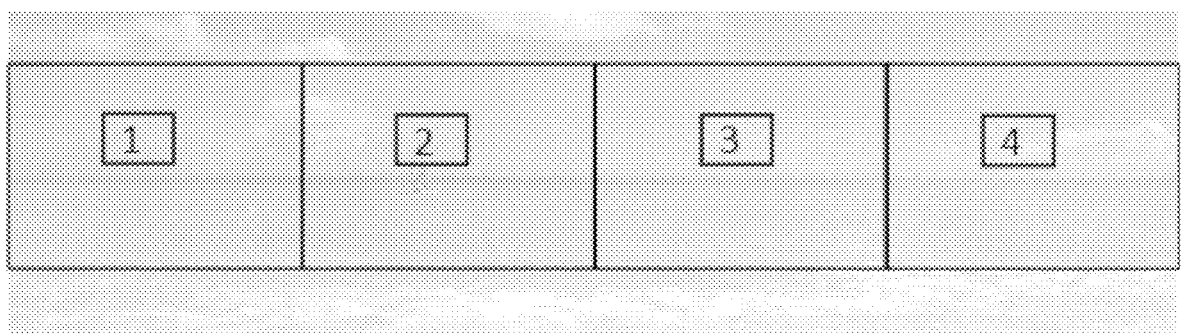
FIG. 3 is a view for describing a panorama photographing technique.
Figure 4:
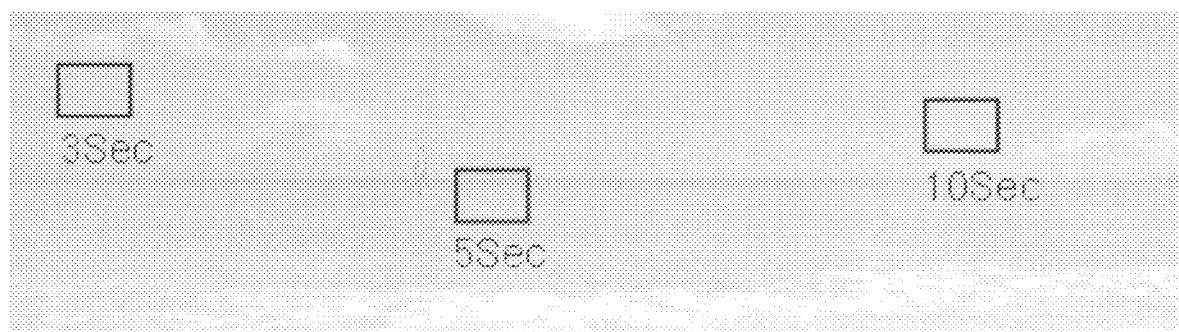
FIG. 4 is a view showing an example of a dynamic video photographing technique according to the related art.
Figure 5:
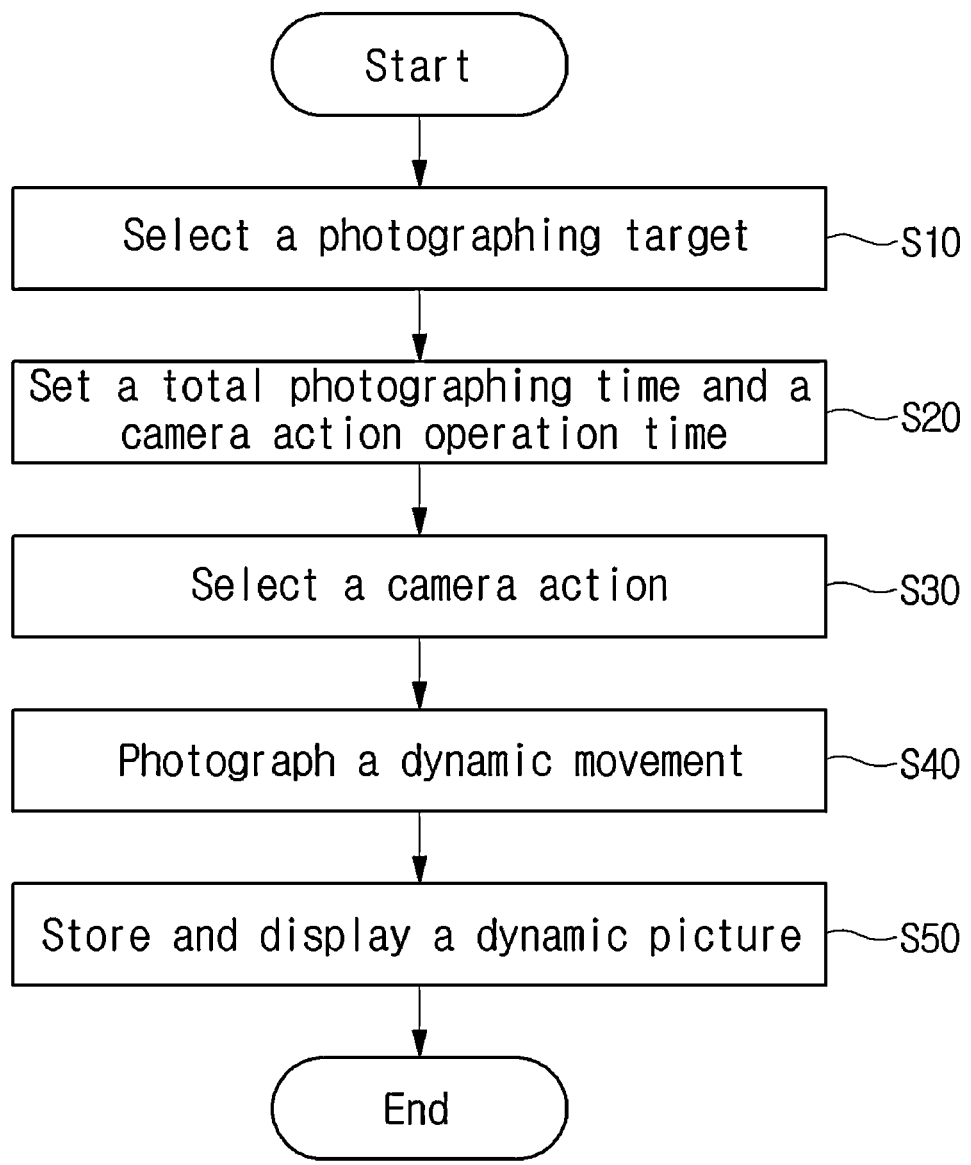
FIG. 5 is a process diagram for describing a method for photographing a dynamic picture according to an exemplary embodiment of the present invention in steps.

FIG. 5 is a process diagram for describing a method for photographing a dynamic picture according to an exemplary embodiment of the present invention in steps.

Hereinafter, terms indicating directions such as 'left', 'right', 'front', 'rear', 'upper' and 'lower' will be defined as indicating directions based on the depicted states in the drawings, respectively.

The method for photographing the dynamic picture according to the exemplary embodiment of the present invention may control an operation in a digital camera including a mobile camera, or operate in a mobile device including a digital camera in which an application is downloaded and activated to perform the method for photographing the dynamic picture.

As shown in FIG. 5, the method for photographing the dynamic picture according to the exemplary embodiment of the present invention may include: selecting a photographing target (S10); setting a total photographing time and a camera action operation time (S20); selecting a camera action operation (S30); photographing a dynamic movement by applying the camera action operation for the set time (S40); and storing the dynamic picture and displaying the dynamic picture on a screen (S50).

In more detail, in the step S10, the photographing target, that is, a subject may be selected.

In the step S20, the total photographing time during which a shutter is opened and closed once when the selected photographing target is photographed, and the operation time during which a camera action is performed in the total photographing time may be set.

In the step S30, the camera action operation may be selected.

For example, the camera action operation may include at least one of horizontal left and right movements, vertical upward and downward movements, a clockwise rotation, a counterclockwise rotation, zoom-in, zoom-out, a vibration, and a user-specified movement.

The vibration may include a big vibration that is greater than a preset reference size and a small vibration that is smaller than the reference size.

The user-specified movement may be set in various shapes such as a figure, an image, a number, and a letter.

A camera action mode for performing the camera action operation may be variously selected, including horizontal, vertical, a rotation, a zoom-in shot, and a rotation zoom-in shot, and a camera movement speed may be provided in stages so that the camera movement speed may be easily set.

Therefore, according to the present invention, a general user may set the camera action mode and the camera action operation time in typical picture photographing settings, so that the general user may easily photograph the dynamic movement through one button manipulation like a photographic expert.

In particular, the present invention may sufficiently apply the camera action to a DSLR or a mobile camera, and may further maximize an effect in a gimbal or a gimbal-integrated camera. In other words, while a camera lens or sensor is moved for performing tilting in a general camera, in a case of a camera to which a gimbal is coupled or a gimbal-integrated camera, the gimbal may be moved to implement the tilting more easily.

In the step S40, the shutter may be operated according to the button manipulation of the user to photograph the dynamic movement.

In the step S50, the photographed dynamic picture may be stored in a memory inside the digital camera, and displayed on the screen of a display.

Next, a method for operating a camera action will be described in detail with reference to FIGS. 6 to 9.

Figure 6:
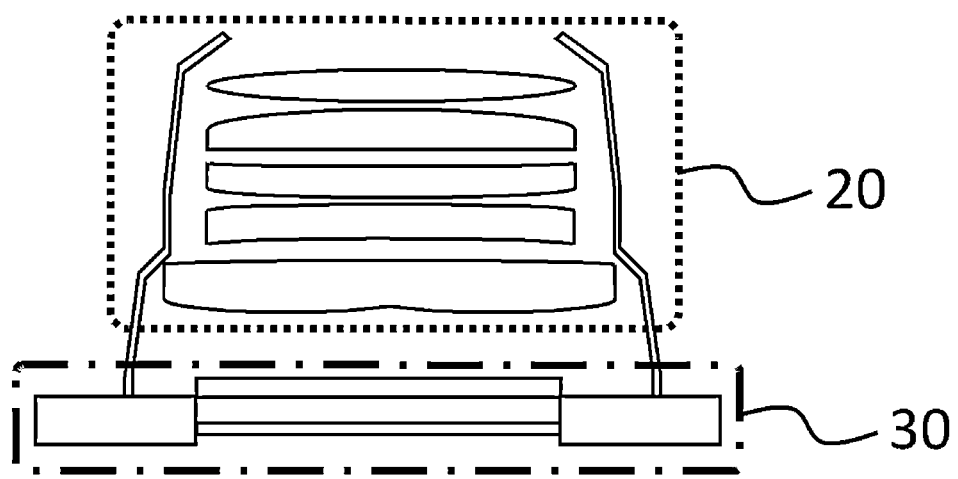
FIG. 6 is a sectional view showing a mobile camera module.
Figure 7:
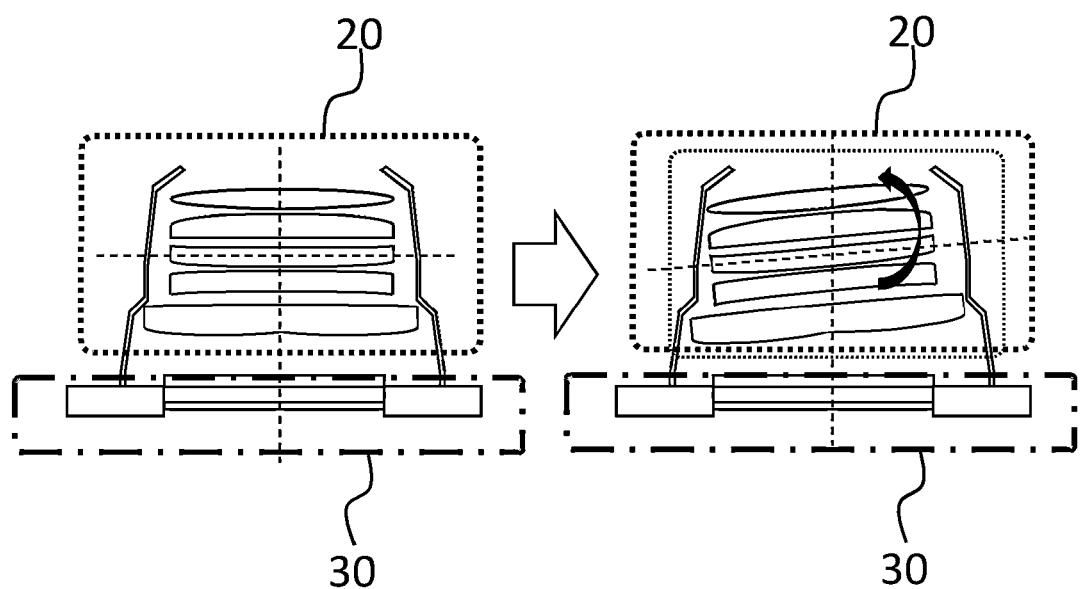
FIG. 7 is a view illustrating a tilting operation of a camera lens shown in FIG. 6.
Figure 8:
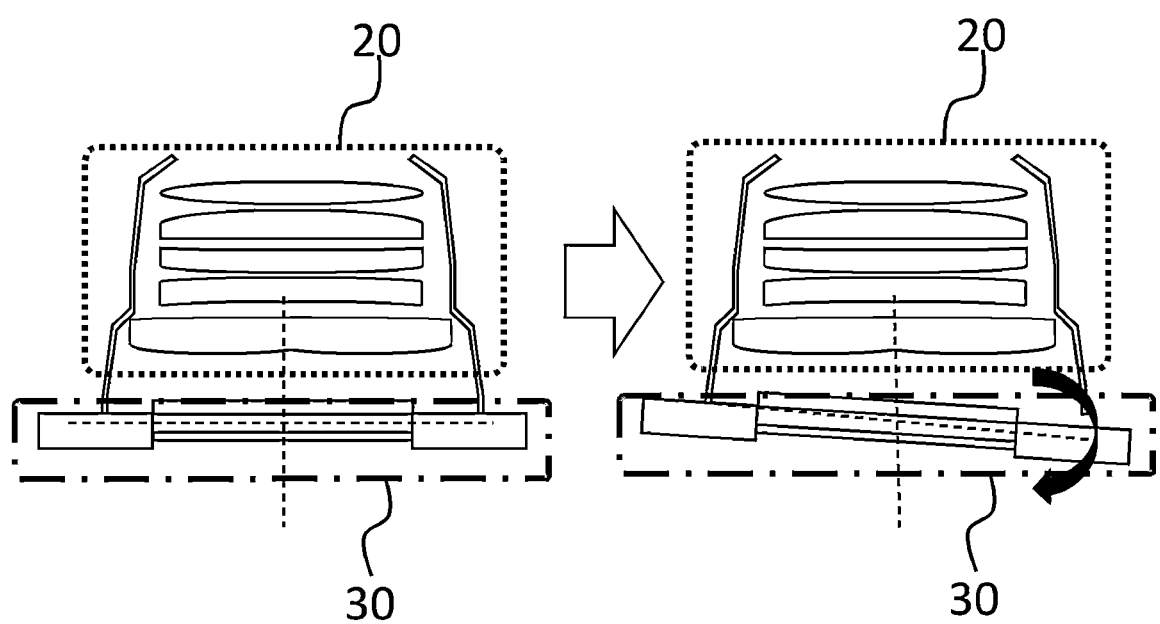
FIG. 8 is a view illustrating a tilting operation of a camera sensor shown in FIG. 6.
Figure 9:
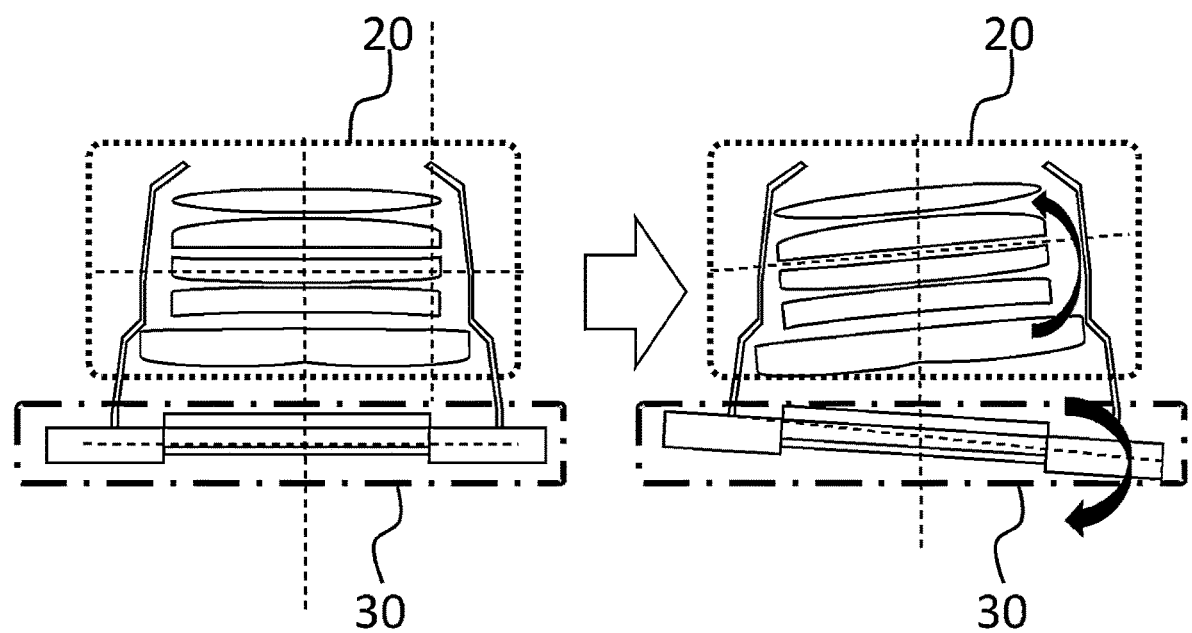
FIG. 9 is a view illustrating the tilting operations of the camera lens and the camera sensor shown in FIG. 6.

FIG. 6 is a sectional view showing a mobile camera module, FIG. 7 is a view illustrating a tilting operation of a camera lens shown in FIG. 6, FIG. 8 is a view illustrating a tilting operation of a camera sensor shown in FIG. 6, and FIG. 9 is a view illustrating the tilting operations of the camera lens and the camera sensor shown in FIG. 6.

As shown in FIG. 6, a mobile camera module 10 may include: a mobile camera lens group 20 (hereinafter abbreviated as "camera lens") including at least one lens; and a mobile camera sensor 30 (hereinafter abbreviated as "camera sensor") for photographing an image incident through the camera lens.

As shown in FIG. 7, the camera action (action or movement, hereinafter referred to as "action") operation may be implemented by tilting the camera lens 20.

FIG. 7 shows a state in which the camera lens 20 is tilted toward a lower left side about a center of the lens.

Alternatively, the camera action operation may be implemented by tilting the camera sensor 30 as shown in FIG. 8.

FIG. 8 shows a state in which the camera sensor 30 is tilted toward a lower right side about a center of the sensor.

In addition, the camera action operation may be implemented by tilting the camera sensor 30 and the camera lens 20 as shown in FIG. 9.

FIG. 9 shows a state in which the camera lens 20 is tilted toward the lower left side about the center of the lens, and the camera sensor 30 is tilted toward the lower right side about the center of the sensor.

As shown in FIG. 9, when the camera lens 20 and the camera sensor 30 are simultaneously tilted in opposite directions, an effect of the camera action operation may be maximized.

The above operations of the camera lens 20 and the camera sensor 30 may be implemented by using a driving unit (not shown) applied to the mobile camera, such as an auto-focusing unit, an electronic image stabilization unit such as digital image stabilization (DIS) or electronic image stabilization (EIS), or an optical image stabilization (OIS) unit.

In addition, when the dynamic picture or video is photographed by using the camera to which the gimbal is installed or the gimbal-integrated camera, the camera action operation may be implemented by using the gimbal instead of the driving unit described above.

Figures 10A, 10B, 10C:
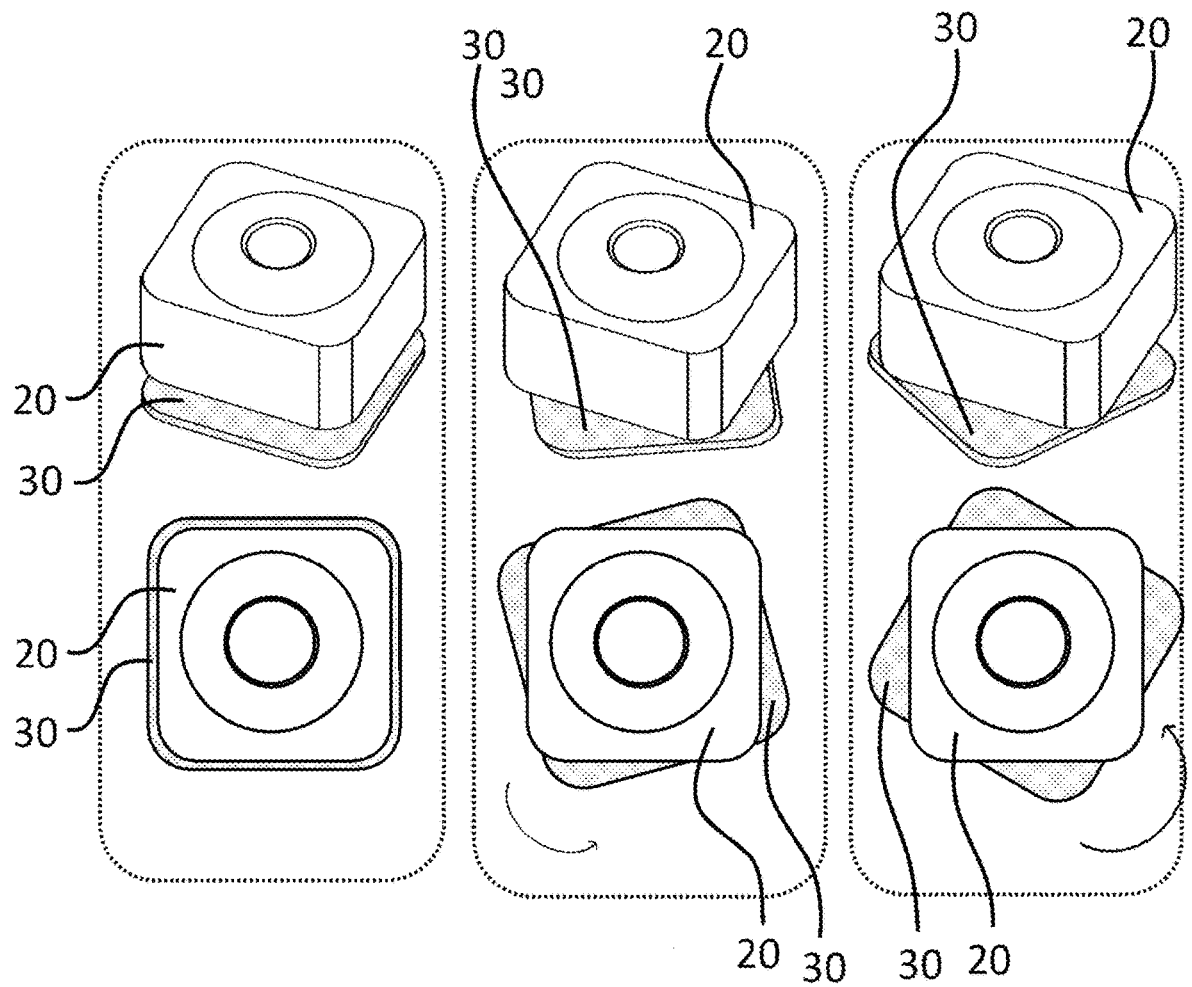
FIGS. 10A-C are views illustrating a rotation shot among camera actions.

Meanwhile, FIGS. 10A-C are views illustrating a rotation shot among camera actions.

FIG. 10A shows a state in which the camera lens and the camera sensor are aligned, FIG. 10B shows a state in which the camera sensor is rotated by about 15° in a counterclockwise direction, and FIG. 10C shows a state in which the camera sensor is further rotated by about 45° in the counterclockwise direction.

In addition, according to the present invention, a camera body in which the camera sensor is installed may be rotated instead of the camera sensor, or the camera sensor and the camera body may be simultaneously rotated in opposite directions, so that the effect of the camera action operation may be maximized. Further, in the case of the camera to which the gimbal is coupled or the gimbal-integrated camera, the camera action operation may be implemented by rotating the gimbal.

Figure 11:
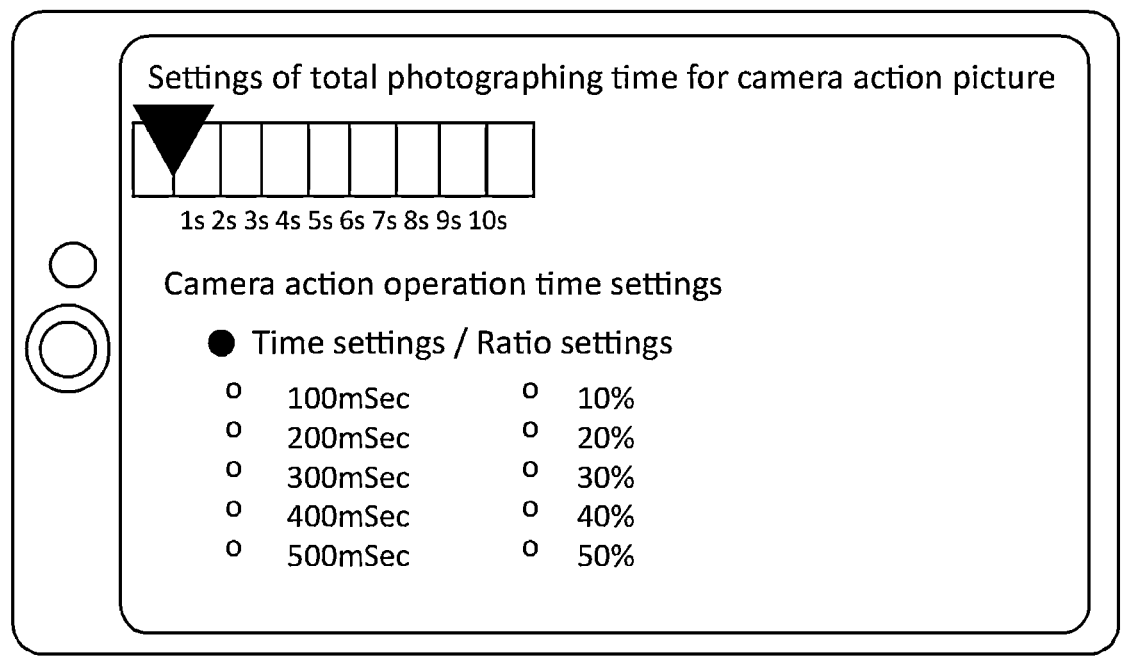
FIG. 11 is a view showing an example for describing a method for setting a total photographing time and a camera action operation time of the dynamic picture.

FIG. 11 is a view showing an example for describing a method for setting a total photographing time and a camera action operation time of the dynamic picture.

FIG. 11 illustrates a screen for setting the total photographing time and the camera action operation time by executing an application in the digital camera.

In other words, the total photographing time may be set by moving or dragging an icon having a triangle shape and displayed on the screen in a unit of 1 second.

In addition, the camera action operation time may be directly selected, or a ratio of the camera action operation time to the total photographing time may be selected.

Figure 12:
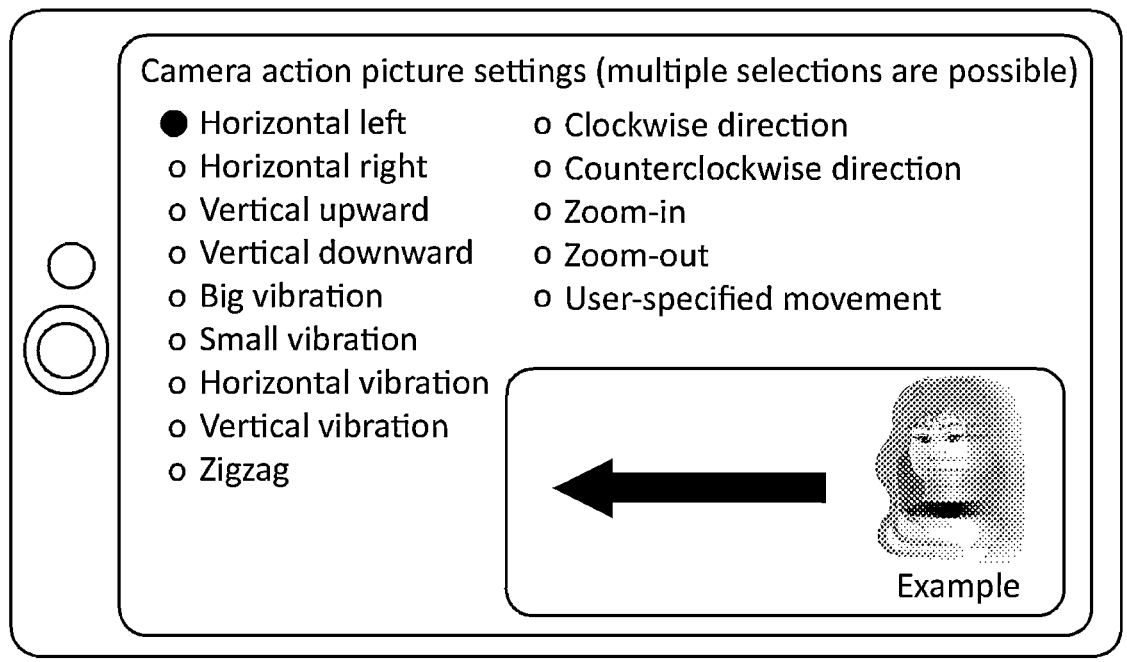
FIGS. 12 and 13 are views showing examples for describing a method for setting a camera action mode.
Figure 13:
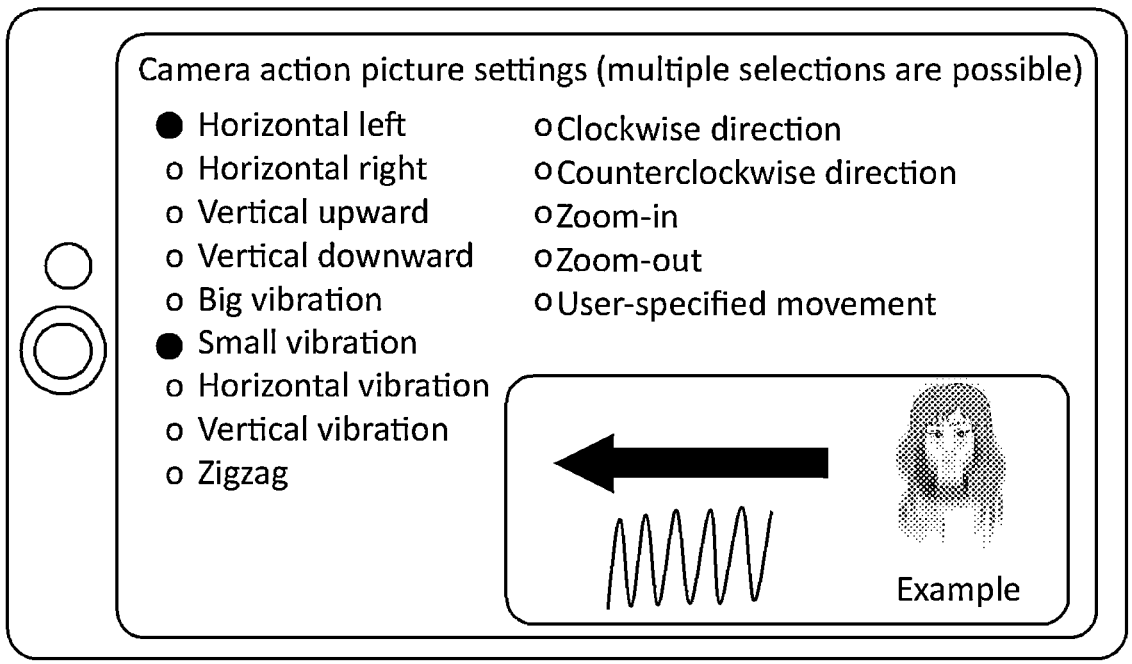

FIGS. 12 and 13 are views showing examples for describing a method for setting a camera action mode.

FIG. 12 illustrates a screen for selecting an operation to be performed in the camera action mode, and FIG. 13 illustrates a screen for selecting a plurality of operations to be performed in the camera action mode.

In other words, according to the present invention, a horizontal movement and a small vibration may be simultaneously selected as well as one operation to be performed in the camera action mode to perform the photographing as shown in FIG. 13.

Figure 14:
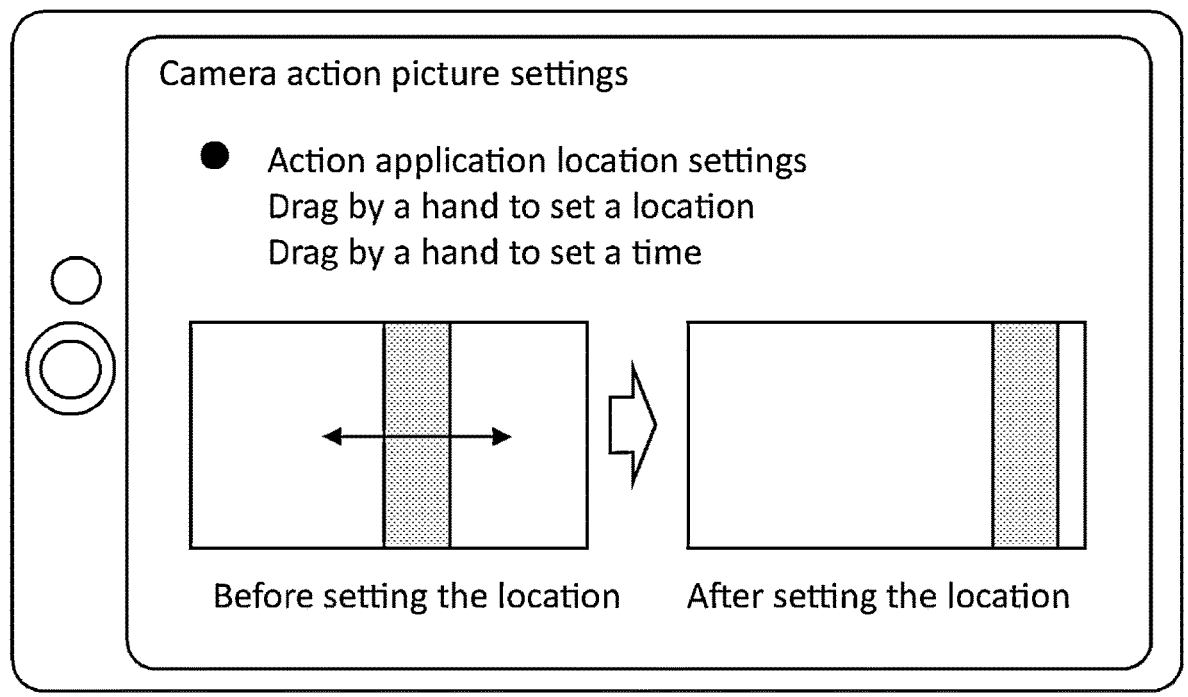
FIGS. 14 to 16 are views showing examples for describing a method for setting a section during which a camera action operation is to be applied in the total photographing time.
Figure 15:
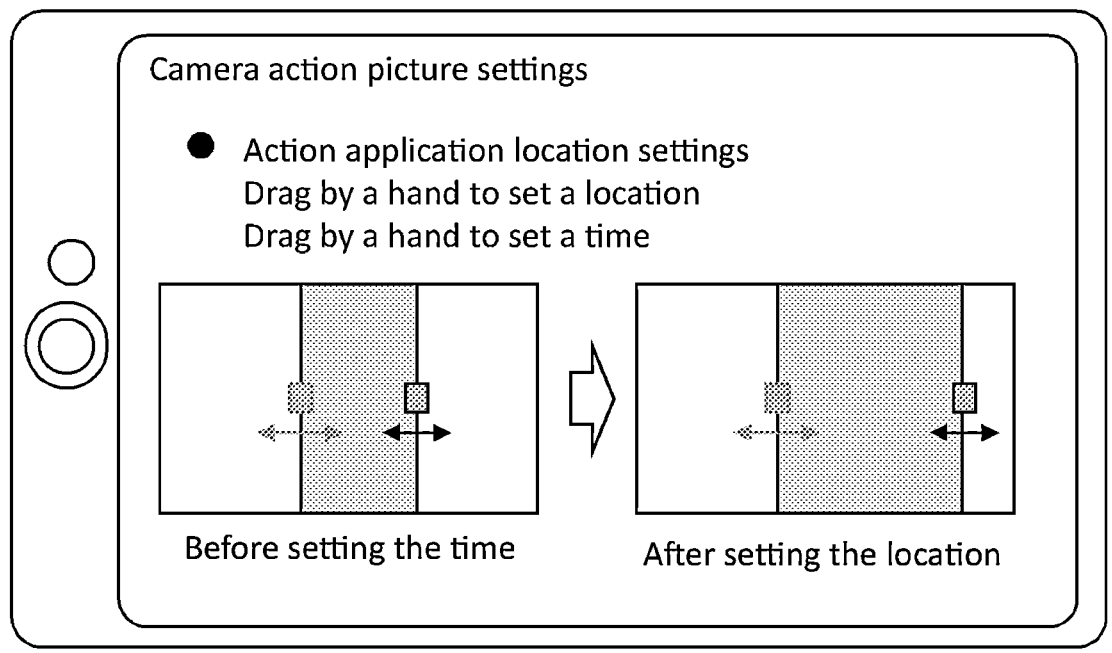
Figure 16:
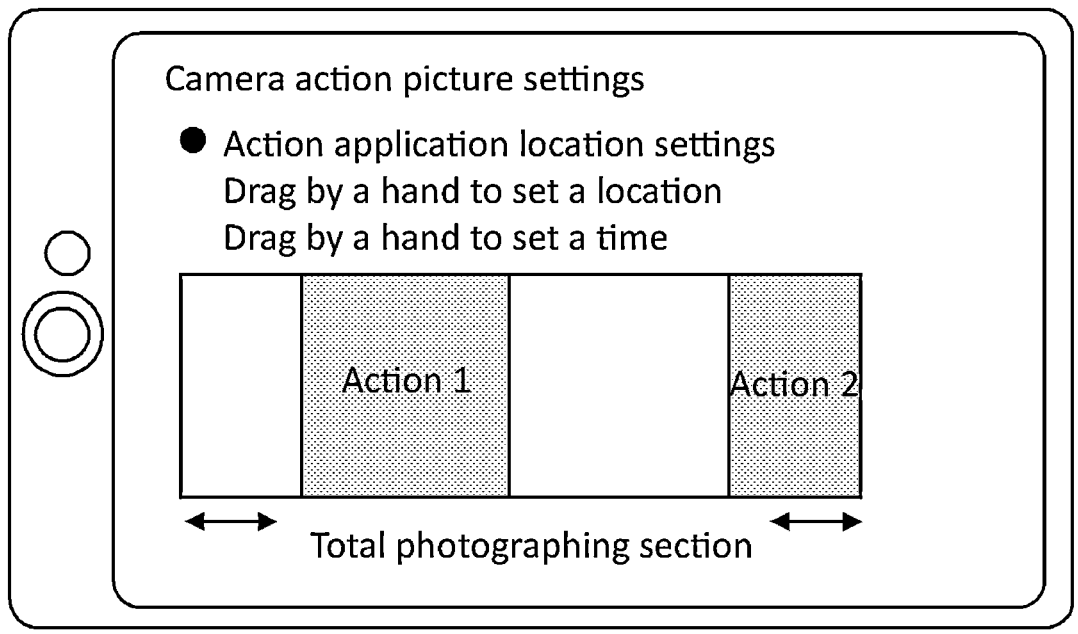

FIGS. 14 to 16 are views showing examples for describing a method for setting a section during which a camera action operation is to be applied in the total photographing time.

An application section of the camera action may be set as a time, or more easily, set as a ratio with respect to the total photographing time, and may be set an application time point to be applied at the beginning of the total photographing time or at the end of the total photographing time.

FIG. 14 illustrates a screen for setting a location and a time to which the camera action is to be applied by performing dragging by a hand, and FIG. 15 illustrates a screen for changing a set camera action time by dragging an end or an end surface of a camera action region.

In other words, the user may set the camera action location and the camera action time by directly inputting the camera action location and the camera action time, setting the camera action location and the camera action time by dragging a camera action time region, or changing the setting by dragging a right drag button.

FIG. 16 illustrates a screen in which a plurality of camera action modes are applied to the beginning and the end of the picture photographing by 10%, respectively.

In other words, the user may set a plurality of sections of the total photographing time as camera action operation times, and set a duration during which each of the set operation times is performed.

Meanwhile, although the method for photographing the dynamic picture has been described in the present embodiment, the present invention is not necessarily limited thereto, and may be applied to the method for photographing the dynamic video.

Figure 17:
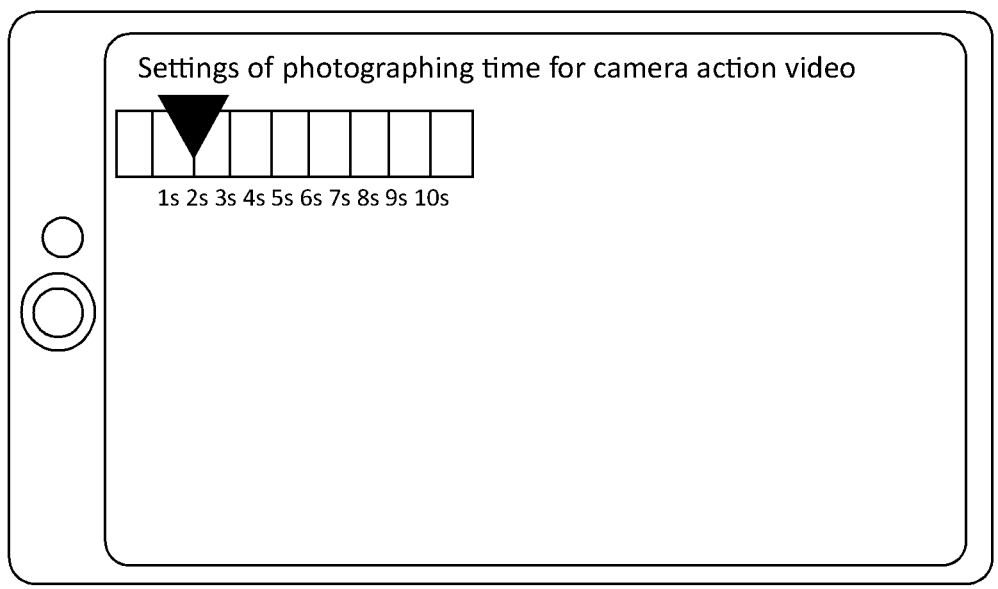
FIGS. 17 to 19 are views showing examples for describing a method for setting the camera action operation when photographing a video.
Figure 18:
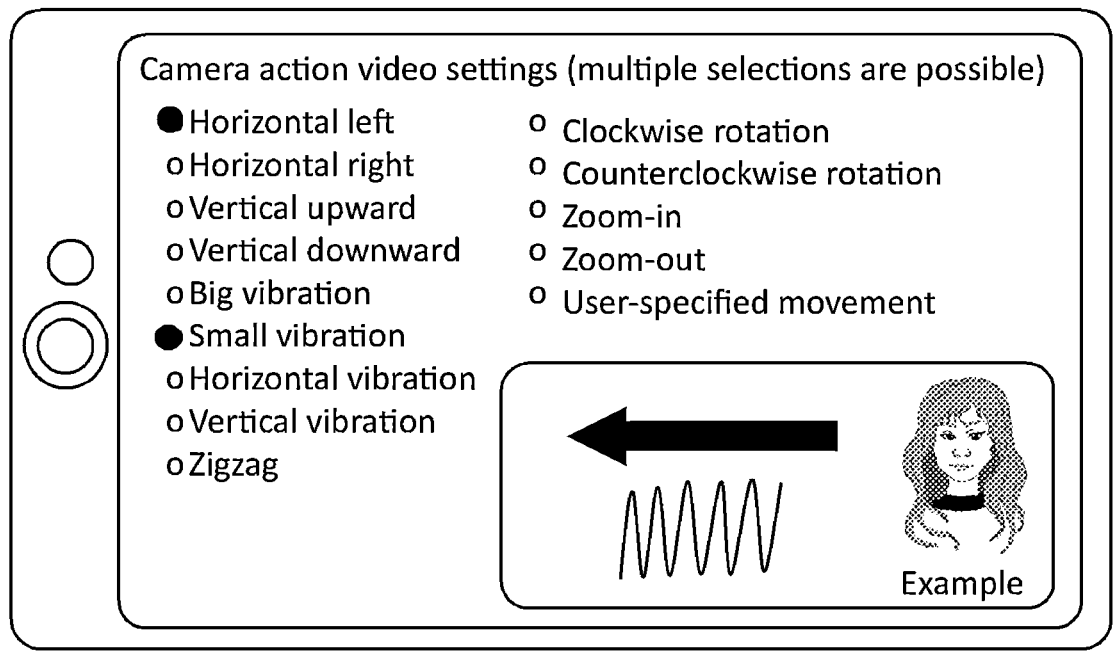
Figure 19:
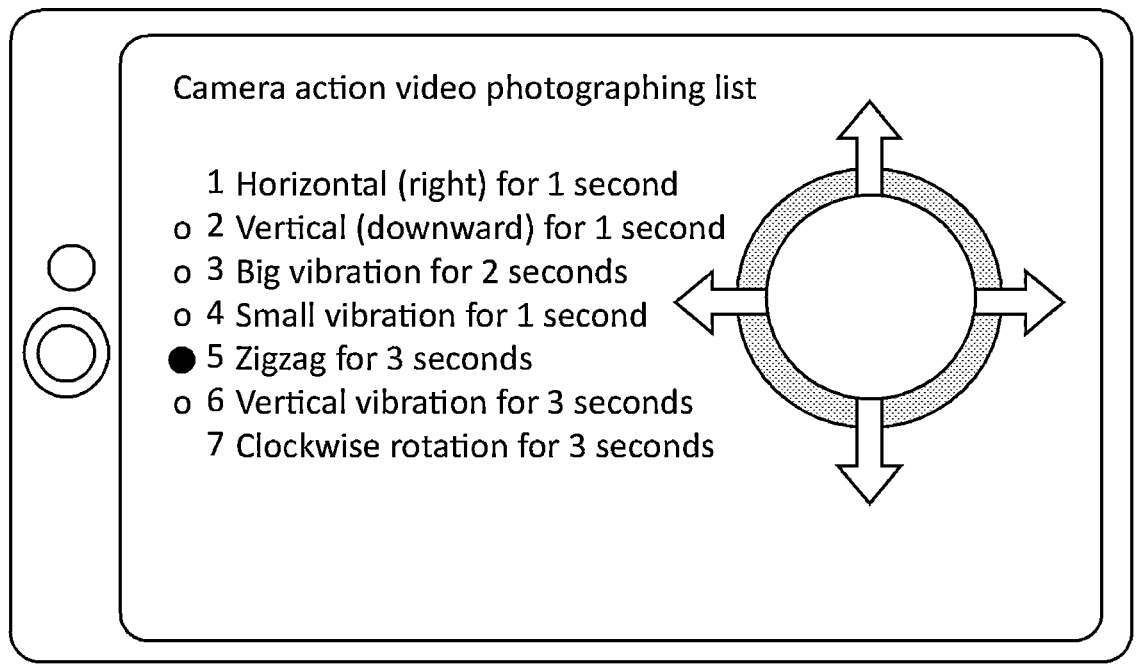

FIGS. 17 to 19 are views showing examples for describing a method for setting the camera action operation when photographing a video.

FIG. 17 illustrates a screen for setting a camera action video photographing time by executing an application of the mobile camera.

The camera action video photographing time may be set in a unit of 1 second as shown in FIG. 17, in which the camera action video photographing time is set to about 3 seconds in FIG. 17.

FIG. 18 illustrates a screen in which a plurality of camera action modes including a horizontal movement and a small vibration are selected for photographing a camera action video.

FIG. 19 illustrates a screen in which a list of preset video camera actions is displayed.

As shown in FIG. 19, a list of a plurality of preset items may be displayed on the screen, and one of the displayed items may be selected through a direction key manipulation of the user or directly selected by using a number shortcut key to photograph a video.

In other words, conventionally, a scheme of photographing a dynamic video by photographing a first viewpoint for 3 seconds, moving to a second viewpoint to photograph the second viewpoint for 5 seconds, and moving to a third viewpoint to photograph the third viewpoint for 10 seconds has been applied.

As described above, the photographing method according to the related art performs the photographing while moving the viewpoint for a relatively long time, whereas the method for photographing the dynamic video according to the present invention performs the photographing by applying a quick action within one viewpoint like a special effect for screen switching. Accordingly, according to the present invention, the screen switching may be optically implemented within one viewpoint for a short time.

In addition, according to the present invention, the user may easily photograph a special effect video for the screen switching in the middle of photographing a general video by setting a camera action operation and a time, and photographing a video for the set time when photographing the video.

Next, examples of the dynamic picture photographed by the camera action operation will be described with reference to FIGS. 20A-C to 24A-C.

FIGS. 20A-C to 24A-C are views illustrating a camera action operation setting screen, a photographing target, and a photographed dynamic picture.

In FIGS. 20A-C to 24A-C, A illustrates a camera action operation setting screen, and B and C illustrate a photographing target and a dynamic picture photographed by the camera action operation, respectively.

FIGS. 20A-C illustrate a dynamic picture photographed when a horizontal movement mode is set among the camera action operations, and the horizontal movement mode of the camera action is operated for 0.5 seconds, which is 25% of a total photographing time of 2 seconds.

Therefore, the photographed dynamic picture may implement a dynamic movement in a right portion of the photographing target that is photographed at the end of the photographing.

FIGS. 21A-C illustrate a dynamic picture photographed when a vertical movement mode is set among the camera action operations, and the vertical movement mode of the camera action is operated for 0.9 seconds, which is 45% of the total photographing time of 2 seconds.

Therefore, the photographed dynamic picture may implement a dynamic movement in a central portion and a lower portion of the photographing target that is photographed after the middle of the photographing.

FIGS. 22A-C illustrate a dynamic picture photographed when a clockwise rotation operation mode is set among the camera action operations, and the clockwise rotation operation mode of the camera action is operated for 0.5 seconds, which is 25% of the total photographing time of 2 seconds.

Therefore, the photographed dynamic picture may implement a dynamic movement by a clockwise rotation operation at the end of the photographing.

FIGS. 23A-C illustrate a dynamic picture photographed when a small vibration mode is set among the camera action operations, the total photographing time is set to 2 seconds, and the small vibration mode of the camera action is operated for 20% of the total photographing time 3 times, that is, for a total of 60% of the total photographing time.

Therefore, the photographed dynamic picture may implement a dynamic movement by the small vibration mode.

FIGS. 24A-C illustrate a dynamic picture photographed by simultaneously selecting a big vibration mode and the horizontal movement mode during the camera action operation, setting the total photographing time to 2 seconds, and applying a plurality of camera actions for 0.5 seconds, which is 25% of the total photographing time.

Therefore, the photographed dynamic picture may implement a dynamic movement by the big vibration mode and the horizontal movement mode.

Figure 25A:
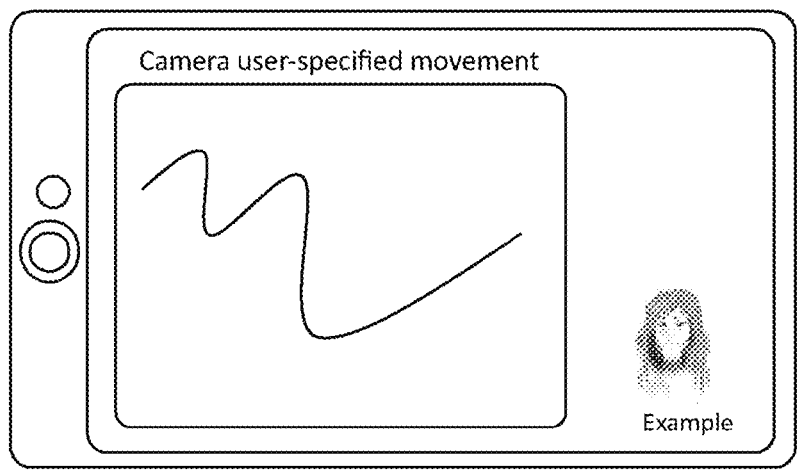
FIGS. 25A-C are views illustrating a method for performing photographing through a camera action operation for a time specified by a user.
Figure 25B:
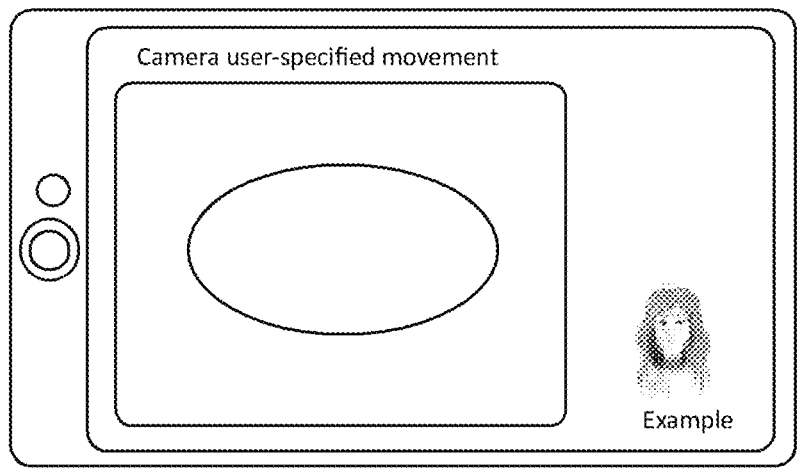
Figure 25C:
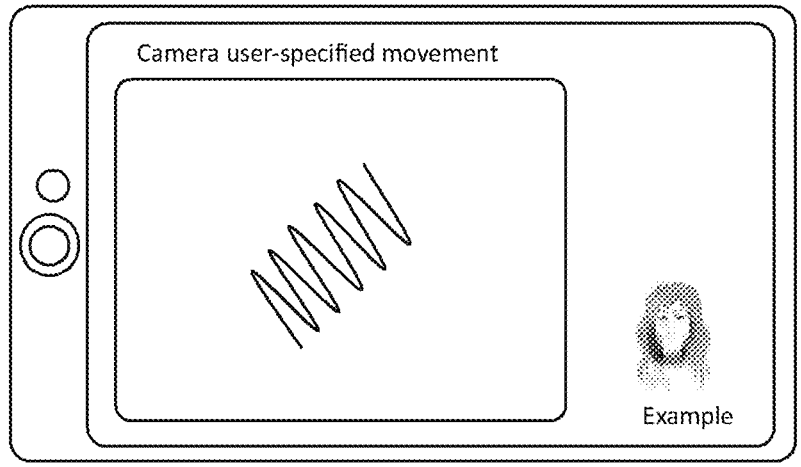

FIGS. 25A-C are views illustrating a method for performing photographing through a camera action operation for a time specified by a user.

FIG. 25A illustrates a method for changing from a small vibration to a big vibration toward a diagonal bottom direction, FIG. 25B illustrates a method for performing photographing through a movement along an elliptical shape, and FIG. 25C illustrates a method for performing photographing by implementing a movement of a small vibration toward a diagonal top direction.

The camera action operation using the user-specified movement may be performed within the set time.

In other words, according to the present invention, various movements may be implemented by performing a camera action operation according to a movement specified by the user for a time specified by the user, and completing a specified camera action operation when the specified time has elapsed.

Figure 26A:
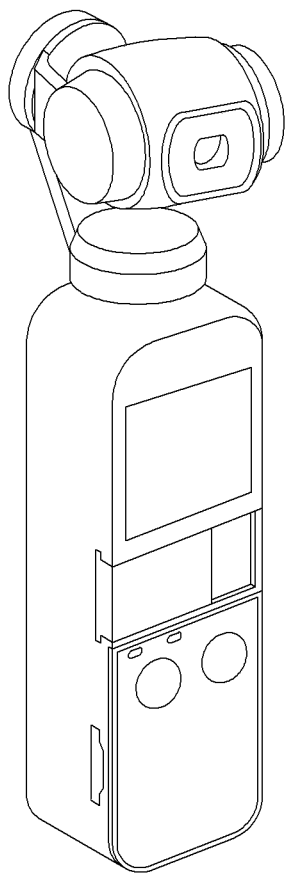
FIGS. 26A-C are views illustrating a photographing method using a gimbal-integrated camera.
Figure 26B:
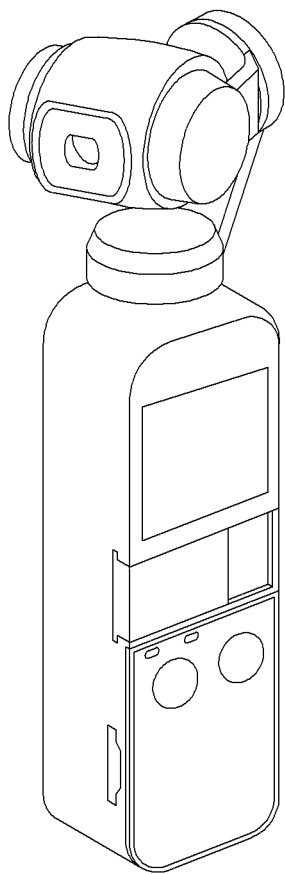
Figure 26C:
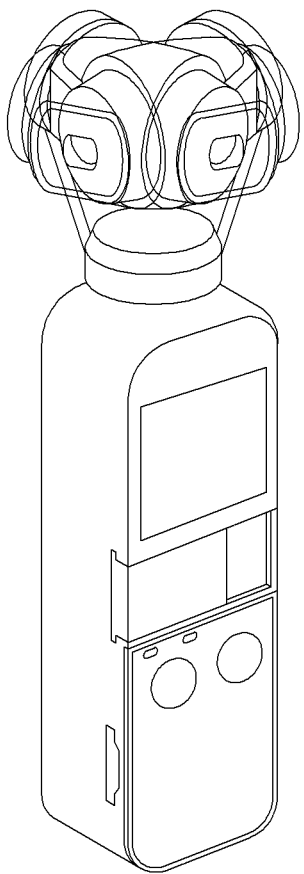

FIGS. 26A-C are views illustrating a photographing method using a gimbal-integrated camera.

The gimbal-integrated camera may perform photographing by implementing a camera action by using a movement of a gimbal without tilting the camera lens or the camera sensor.

FIG. 26A illustrates a state before the movement of the gimbal in the gimbal-integrated gimbal camera, FIG. 26B illustrates a state after the movement of the gimbal, and FIG. 26C illustrates an overall movement.

In other words, according to the present invention, when the gimbal-integrated camera or the camera to which the gimbal is coupled is used, various movements may be implemented by implementing the camera action operation through the movement of the gimbal.

Figure 27A:
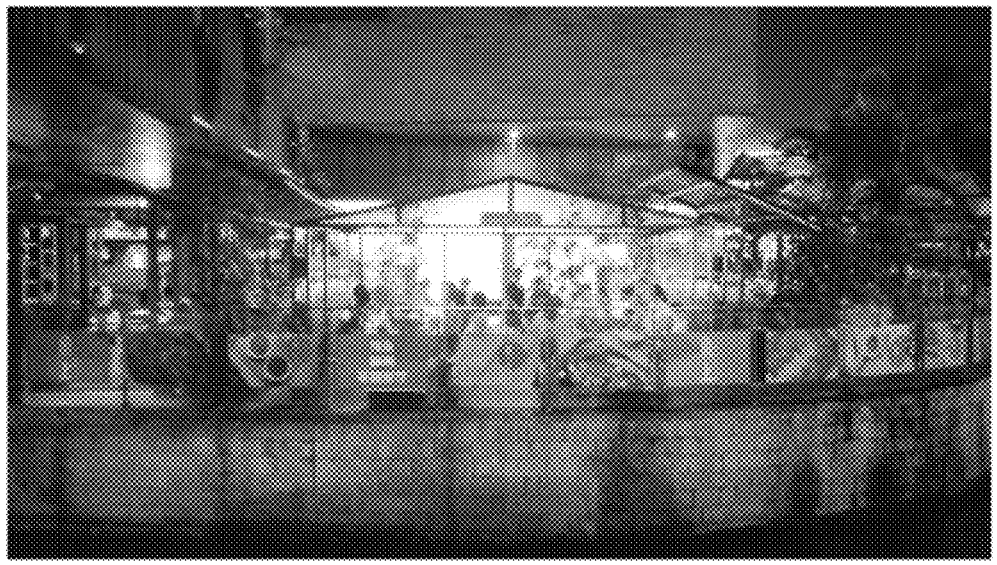
FIGS. 27A-B are views showing an example of a dynamic picture photographed in a clockwise rotation shot mode among camera action operations.
Figure 27B:
Figure 28:
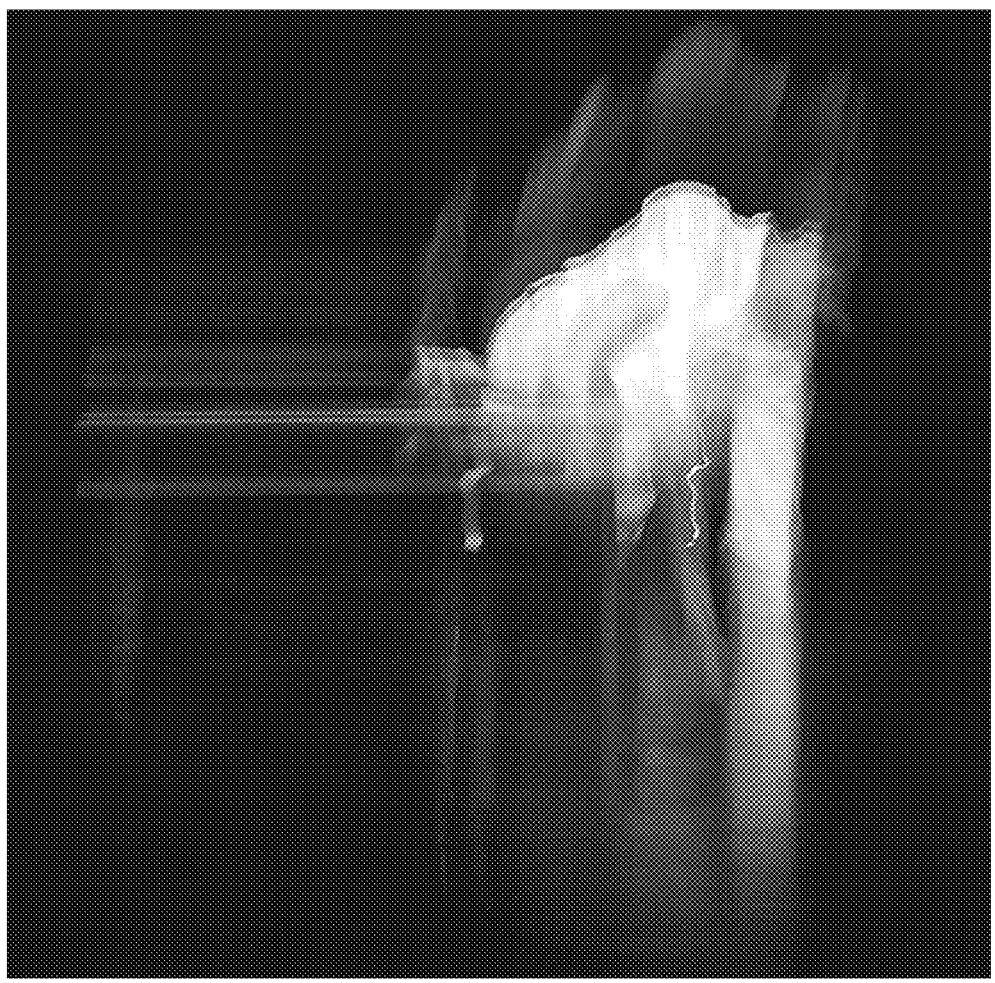
FIG. 28 is a view showing an example of a dynamic picture photographed in a vertical movement mode.

Meanwhile, FIG. 27A-B is a view showing an example of a dynamic picture photographed in a clockwise rotation shot mode among camera action operations, and FIG. 28 is a view showing an example of a dynamic picture photographed in a vertical movement mode.

FIG. 27A illustrates a general static picture, and FIG. 27B illustrates the dynamic picture photographed in the clockwise rotation shot mode.

In other words, when the camera performs the photographing by rotating in a clockwise direction for 300 ms to 350 ms in a total photographing time of 1 second (1,000 ms), the dynamic picture as shown in FIG. 27B may be photographed.

FIG. 28 illustrates a dynamic picture photographed in the vertical movement mode among the camera action operations.

In this case, the total photographing time may be 1 second (1,000 ms), and the dynamic picture as shown in FIG. 28 may be photographed by applying the vertical movement mode for 100 ms to 150 ms, which is 15% of the total photographing time.

In addition, according to the present invention, when a dynamic picture of a stopped vehicle is photographed, a camera action may be set to a horizontal direction, for example, right, the camera action may be set for 0.5 seconds, which is the last 1.5 seconds to 2 seconds of a total photographing time of 2 seconds, and a dynamic movement may be photographed through one button manipulation.

Then, the vehicle may be photographed in a stopped state from 0 second to 1.5 seconds in the total photographing time of 2 seconds, and the camera may perform the photographing by rapidly moving to the right from a current viewpoint from the last 1.5 seconds to 2 seconds, so that a dynamic movement as if the vehicle is running forward may be photographed.

In this case, the camera action mode may be variously selected, including horizontal, vertical, a rotation, a zoom-in shot, and a rotation zoom-in shot, and the camera movement speed may be provided in stages so that the user may easily set the camera movement speed.

Accordingly, according to the present invention, when the user sets the camera action mode and the camera action application time in existing picture photographing settings, the user may easily photograph the dynamic movement through one button manipulation like a photographic expert.

In addition, according to the present invention, a dynamic movement may be photographed by setting a camera action operation time and a dynamic direction in advance when photographing a video, and applying a dynamic effect through one button manipulation at a time when a dynamic effect of a camera action for screen switching is required in a process of photographing the video.

When photographing a video with a conventional camcorder or mobile camera, a very difficult process has been required to apply the dynamic effect described above.

Meanwhile, according to the present invention, as described above, a dynamic screen switching video may be easily photographed through the button manipulation in the middle of photographing the video when photographing the video.

Accordingly, the user may easily photograph various dynamic pictures with advanced techniques, which are photographed by photographic experts with difficulty, simply through several selection operations, and even when more photographing techniques are applied, the photographing may be freely and easily performed with difficult advanced dynamic techniques that have been used by the experts in a high-end DSLR.

In addition, according to the present invention, even in the case of the video, a time and a dynamic effect set in advance may be set to immediately apply the dynamic effect through a button manipulation at a time when a dynamic video by a camera action is required, so that various video may be photographed.

As a result, according to the present invention, when photographing a picture, the user may photograph the picture by arbitrarily setting a part of a total picture photographing time, and apply a preset camera action during the set camera action operation time to photograph a static picture during a time in which a general picture is photographed, and photograph a dynamic picture during the camera action operation time so as to easily photograph a beautiful and dynamic picture like one picture or a picture obtained by synthesizing multiple pictures.

Similarly, according to the present invention, when photographing a video, a camera action video time may be set in advance, a camera action mode may be set in advance, and a video with a dynamic effect may be photographed through a button manipulation at a time when a dynamic camera action video is required in the middle of photographing the video.

For example, when a human face is photographed with a forest in the background, the camera action mode may be set to a rotation shot, the photographing time may be set to 2 seconds, a focus may be set on the human face, which is the photographing target, and a video may be photographed for 1 minute.

In this case, when a button for photographing the camera action video is manipulated immediately before moving the focus to a distant forest, the camera may perform photographing while rotating for 2 seconds that is set in advance, so that a video in which screen switching is performed by rotating for 2 seconds may be photographed.

As described above, according to the present invention, when photographing the video, even an ordinary person who is not a video photographing expert may easily implement video screen switching by using a software filter effect that is widely used.

Through the process as described above, according to the present invention, various dynamic movements can be photographed by selecting the photographing target, setting the time during which the camera action is operated in the total photographing time, and selecting the camera action for the set time.

In addition, according to the present invention, a static picture and a dynamic picture to which various dynamic picture techniques are applied can be photographed as one picture.

Accordingly, according to the present invention, a general user without professional knowledge about picture photographing can easily and conveniently photograph the dynamic picture to which various dynamic picture techniques are applied by using a mobile camera or the like.

Although the present invention invented by the present inventor has been described in detail with reference to the above embodiments, the present invention is not limited to the embodiments, and various modifications are possible without departing from the gist of the present invention.

The present invention is applied to a method technique for photographing a dynamic picture and a dynamic video, capable of photographing various dynamic movements by selecting a photographing target, setting a time during which a camera action is operated in a total photographing time, and selecting the camera action for the set time.

What is claimed is:

1. A method for photographing a dynamic picture and a dynamic video with an aid of a digital camera in which an application is downloaded and executed by a computer of the digital camera to perform the method for the photographing of the dynamic picture and the dynamic video, the method comprising:

providing the digital camera with the computer and a data base for the photographing including a range of a photographing time, categories of camera action operations and a range of a camera action operation time;

receiving, by the computer, a selection of a photographing target;

receiving respectively, by the computer, a setting of a total photographing time and a camera action operation time, wherein each of the total photographing time and the camera action operation time is received independently, the camera action operation time is less or equal to the total photographing time, the camera action operation time is set as a part of a time period, or set as a ratio with respect to the total photographing time, and at least one start point of the camera action operation time is set as at least one time point out of the total photographing time;

receiving, by the computer, a selection of at least one of the camera action operations;

automatically counting, by the computer, respectively the total photographing time and the camera action operation time during the total photographing time, wherein the camera action operation time is counted from the at least one start point, and a counting of the camera action operation time is lapsed after counting for the camera action operation time before a counting of the total photographing time is lapsed; and automatically applying, by the computer, a dynamic movement based on the selected camera action operation for the set time camera action operation time from the at least one start point.

2. The method of claim 1, wherein the camera action operation includes at least one of horizontal left and right movements, vertical upward and downward movements, a clockwise rotation, a counterclockwise rotation, zoom-in, zoom-out, a vibration, zigzag, and a user-specified movement, and the vibration includes a big vibration that is larger than a preset reference size and a small vibration that is smaller than the reference size.

3. The method of claim 2, further comprising (e) storing the photographed dynamic picture or the photographed dynamic video in a memory, and displaying the dynamic picture or the dynamic video on a screen of a display, wherein the dynamic picture implements a static picture and a dynamic picture into one picture.

4. The method of claim 3, wherein the camera action operation is implemented by the computer which controls a tilting operation of at least one of a camera lens and a camera sensor provided in a camera module.

5. The method of claim 4, wherein, when photographing the dynamic picture or the dynamic video, the dynamic movement is photographed by applying the camera action operation set by a button manipulation of a user.

6. The method of claim 4, wherein the camera action operation is implemented through a movement of a gimbal in a case of a camera to which the gimbal is coupled or a gimbal-integrated camera.

7. The method of claim 2, wherein the camera action operation is implemented by the computer which controls a tilting operation of at least one of a camera lens and a camera sensor provided in a camera module.

8. The method of claim 7, wherein, when photographing the dynamic picture or the dynamic video, the dynamic movement is photographed by applying the camera action operation set by a button manipulation of a user.

9. The method of claim 7, wherein the camera action operation is implemented through a movement of a gimbal in a case of a camera to which the gimbal is coupled or a gimbal-integrated camera.

10. The method of claim 2, wherein the user-specified movement implements the camera action operation that is directly specified by a user within the camera action operation time set by the user, and completes the operation when the set camera action operation time elapses.

11. The method of claim 1, wherein the camera action operation is implemented by the computer which controls a tilting operation of at least one of a camera lens and a camera sensor provided in a camera module.

12. The method of claim 11, wherein, when photographing the dynamic picture or the dynamic video, the dynamic movement is photographed by applying the camera action operation set by a button manipulation of a user.

13. The method of claim 11, wherein the camera action operation is implemented through a movement of a gimbal in a case of a camera to which the gimbal is coupled or a gimbal-integrated camera.

* * * * *